(12) United States Patent
Shimizu et al.

(10) Patent No.: US 10,003,430 B2
(45) Date of Patent: Jun. 19, 2018

(54) TRANSCEIVING SYSTEM, TRANSMITTER, RECEIVER, AND CONTROL METHOD OF TRANSCEIVING SYSTEM

(71) Applicant: FUJITSU LIMITED, Kawasaki-shi, Kanagawa (JP)

(72) Inventors: Takashi Shimizu, Kawasaki (JP); Takashi Miyoshi, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 151 days.

(21) Appl. No.: 15/168,346

(22) Filed: May 31, 2016

(65) Prior Publication Data

US 2017/0033883 A1 Feb. 2, 2017

(30) Foreign Application Priority Data

Jul. 29, 2015 (JP) ................ 2015-149979

(51) Int. Cl.
*H04B 10/08* (2006.01)
*H04B 17/00* (2015.01)
(Continued)

(52) U.S. Cl.
CPC .... *H04J 14/0221* (2013.01); *H04B 10/07955* (2013.01); *H04B 10/40* (2013.01);
(Continued)

(58) Field of Classification Search
CPC ............ H04B 10/293; H04B 10/07955; H04B 10/294; H04B 10/564; H04B 10/672; H04J 14/0221
(Continued)

(56) References Cited

U.S. PATENT DOCUMENTS 5,777,761 A * 7/1998 Fee .................. H04J 14/0291
370/225
5,796,504 A * 8/1998 Sonderegger ...... G01D 5/35383
398/104
(Continued)

FOREIGN PATENT DOCUMENTS

JP          10-28106       1/1998
JP          2000-236299    8/2000
(Continued)

*Primary Examiner* — David Payne
*Assistant Examiner* — Pranesh Barua
(74) *Attorney, Agent, or Firm* — Fujitsu Patent Center

(57) ABSTRACT

A transceiving system includes: a transmitter; and a receiver coupled to the transmitter via optical transmission lines, the transmitter includes: a first processor configured to generate division data obtained by dividing data; a modulator configured to modulate wavelengths of transport lights, which transport the division data, based on setting information including a correspondence relationship between identification information identifying each of the optical transmission lines and wavelength information indicating a wavelength, and output lights, each of which is superimposed with the respective division data, to the optical transmission lines; and a second processor configured to transmit changed setting information, which is obtained by changing the setting information, to the receiver, and the receiver includes: a de-multiplexer configured to separate lights from the optical transmission lines into de-multiplexed lights of a wavelengths, based on the changed setting information; and a third processor configured to convert the de-multiplexed lights into division data.

7 Claims, 13 Drawing Sheets

(51) Int. Cl.
*H04B 10/04* (2006.01)
*H04B 10/12* (2006.01)
*H04J 14/02* (2006.01)
*H04B 10/079* (2013.01)
*H04B 10/40* (2013.01)
*H04B 10/572* (2013.01)
*H04B 10/564* (2013.01)
*H04B 10/61* (2013.01)

(52) U.S. Cl.
CPC ......... *H04B 10/564* (2013.01); *H04B 10/572* (2013.01); *H04B 10/61* (2013.01)

(58) Field of Classification Search
USPC ........................................................ 398/197
See application file for complete search history.

(56) References Cited

U.S. PATENT DOCUMENTS

| | | | | |
|---|---|---|---|---|
| 6,031,647 A * | 2/2000 | Roberts | ............... | H04B 10/503 398/197 |
| 6,204,945 B1 * | 3/2001 | Iwata | ................... | H04B 10/506 398/9 |
| 6,282,005 B1 * | 8/2001 | Thompson | .......... | H04B 10/505 359/254 |
| 6,661,974 B1 | 12/2003 | Akiyama et al. | | |
| 6,944,362 B2 * | 9/2005 | Jasti | ..................... | H04B 10/032 385/16 |
| 8,009,988 B2 * | 8/2011 | Phillips | ............. | H04B 10/2507 398/115 |
| 2002/0126348 A1 * | 9/2002 | Lange | ................. | H04B 10/077 398/34 |
| 2002/0171889 A1 * | 11/2002 | Takeuchi | ............ | H04B 10/077 398/34 |
| 2004/0105677 A1 * | 6/2004 | Hamada | ............. | G02B 6/12007 398/79 |
| 2004/0247314 A1 * | 12/2004 | Kawarai | ............ | H04B 10/077 398/27 |
| 2005/0244161 A1 * | 11/2005 | Satoh | .................. | H04J 14/0227 398/85 |
| 2006/0029391 A1 * | 2/2006 | Yuki | ................... | H04J 14/0221 398/45 |
| 2009/0196598 A1 * | 8/2009 | Duan | .................. | H04B 10/032 398/5 |
| 2010/0054741 A1 * | 3/2010 | Urino | ..................... | H04J 14/02 398/79 |
| 2010/0158532 A1 * | 6/2010 | Goto | ................ | H04B 10/07955 398/81 |
| 2010/0232786 A1 * | 9/2010 | Aoki | .................... | H04J 3/1658 398/19 |
| 2010/0254704 A1 * | 10/2010 | Aoki | ...................... | H04B 10/40 398/45 |
| 2011/0008049 A1 * | 1/2011 | Tanonaka | ............ | H04J 14/0291 398/79 |
| 2011/0116790 A1 * | 5/2011 | Sakauchi | ............ | H04J 14/0204 398/5 |
| 2011/0188851 A1 * | 8/2011 | Oda | ...................... | H04J 14/021 398/26 |
| 2011/0299858 A1 * | 12/2011 | Mazzini | ............... | H04B 10/516 398/183 |
| 2012/0063771 A1 * | 3/2012 | Sugaya | .............. | H04B 10/2935 398/26 |
| 2012/0121259 A1 * | 5/2012 | Kuwata | ............ | H04B 10/07955 398/38 |
| 2012/0148244 A1 * | 6/2012 | Park | ................... | G02B 6/12007 398/58 |
| 2012/0195600 A1 * | 8/2012 | Winzer | .............. | H04B 10/2504 398/143 |
| 2012/0219282 A1 * | 8/2012 | Koganei | ............ | H04J 3/1652 398/1 |
| 2013/0129360 A1 * | 5/2013 | Zbinden | ............. | H04B 10/2503 398/139 |
| 2013/0183040 A1 * | 7/2013 | Elahmadi | ........... | H04B 10/2507 398/79 |
| 2013/0294782 A1 * | 11/2013 | Liboiron-Ladouceur | ........... | H04B 10/616 398/202 |
| 2013/0308942 A1 * | 11/2013 | Ji | ........................... | H04B 10/25 398/45 |
| 2014/0205286 A1 * | 7/2014 | Ji | ........................... | H04B 10/40 398/45 |
| 2014/0286634 A1 * | 9/2014 | Tsuiki | .................. | H04B 10/032 398/5 |
| 2015/0050020 A1 * | 2/2015 | Tanaka | ................ | H04J 14/0282 398/65 |
| 2015/0078744 A1 * | 3/2015 | Ito | ........................... | H04J 14/04 398/43 |
| 2015/0132015 A1 * | 5/2015 | Hayakawa | ............ | G02F 1/025 398/200 |
| 2015/0188638 A1 * | 7/2015 | Tanaka | ............... | H04B 10/0799 398/140 |
| 2015/0261061 A1 * | 9/2015 | Akiyama | ................ | G02F 1/225 385/2 |
| 2016/0020856 A1 * | 1/2016 | Charbonneau-Lefort | ................ | H04B 10/2575 398/116 |
| 2016/0134363 A1 * | 5/2016 | Buckland | ............ | H04B 10/038 398/5 |
| 2016/0204878 A1 * | 7/2016 | Goodwill | ............ | H04B 10/506 398/115 |

FOREIGN PATENT DOCUMENTS

JP 2005-341529 12/2005
WO WO 2013179467 A1 * 12/2013 .......... H04J 14/0282

* cited by examiner

FIG. 5

601 TRANSMITTER POWER CONSUMPTION

| TRANSMITTER POWER CONSUMPTION | | MODULATING UNIT | | | |
|---|---|---|---|---|---|
| | | 1 | 2 | 3 | 4 |
| WAVELENGTH | A | 30 | 10 | 0 | 29 |
| | B | 14 | 4 | 22 | 18 |
| | C | 28 | 18 | 0 | 9 |
| | D | 1 | 3 | 2 | 28 |

602 RECEIVER POWER CONSUMPTION

| RECEIVER POWER CONSUMPTION | | DE-MULTIPLEXING UNIT | | | |
|---|---|---|---|---|---|
| | | 1 | 2 | 3 | 4 |
| WAVELENGTH | A | 15 | 29 | 2 | 27 |
| | B | 7 | 22 | 28 | 29 |
| | C | 27 | 16 | 18 | 20 |
| | D | 10 | 12 | 21 | 11 |

603 SUM POWER CONSUMPTION

| SUM POWER CONSUMPTION | | LANE NUMBER | | | |
|---|---|---|---|---|---|
| | | 1 | 2 | 3 | 4 |
| WAVELENGTH | A | 45 | 39 | 2 | 56 |
| | B | 21 | 26 | 50 | 47 |
| | C | 55 | 34 | 18 | 29 |
| | D | 11 | 15 | 23 | 39 |

604 SUM POWER CONSUMPTION

| SUM POWER CONSUMPTION | | LANE NUMBER | | | |
|---|---|---|---|---|---|
| | | 1 | 2 | 3 | 4 |
| WAVELENGTH | A | 45 | 39 | 2 | 56 |
| | B | 21 | 26 | 50 | 47 |
| | C | 55 | 34 | 18 | 29 |
| | D | 11 | 15 | 23 | 39 |

FIG. 6

| TRANSMITTER POWER CONSUMPTION | | MODULATING UNIT 701 | | | |
|---|---|---|---|---|---|
| | | 1 | 2 | 3 | 4 |
| WAVELENGTH | A | 25 | 20 | 14 | 23 |
| | B | 26 | 4 | 29 | 4 |
| | C | 14 | 20 | 26 | 9 |
| | D | 20 | 20 | 13 | 14 |

| RECEIVER POWER CONSUMPTION | | DE-MULTIPLEXING UNIT 702 | | | |
|---|---|---|---|---|---|
| | | 1 | 2 | 3 | 4 |
| WAVELENGTH | A | 10 | 20 | 18 | 1 |
| | B | 18 | 28 | 28 | 22 |
| | C | 28 | 18 | 29 | 5 |
| | D | 9 | 21 | 0 | 25 |

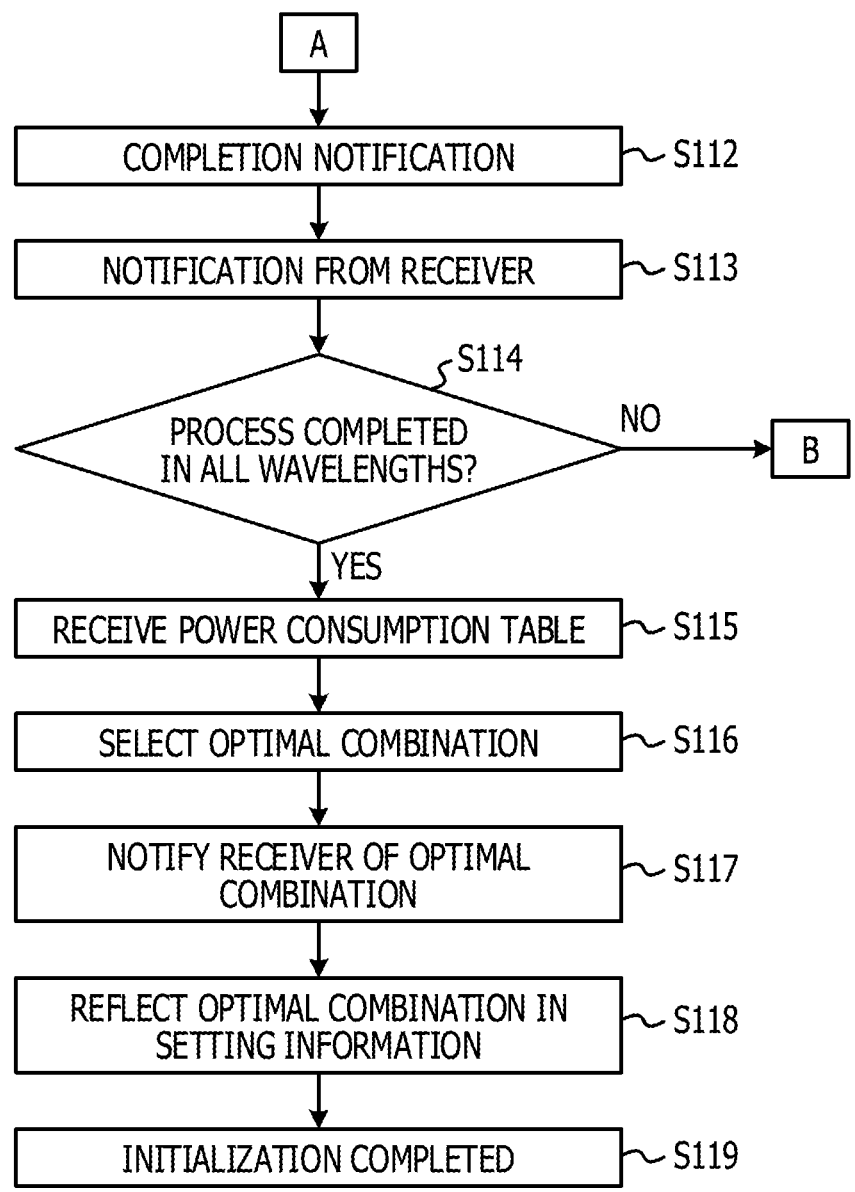

US 10,003,430 B2

TRANSCEIVING SYSTEM, TRANSMITTER, RECEIVER, AND CONTROL METHOD OF TRANSCEIVING SYSTEM

CROSS-REFERENCE TO RELATED APPLICATION

This application is based upon and claims the benefit of priority of the prior Japanese Patent Application No. 2015-149979, filed on Jul. 29, 2015, the entire contents of which are incorporated herein by reference.

FIELD

The embodiments discussed herein are related to optical wavelength-multiplexing communication.

BACKGROUND

In recent years, the computing speed of, for example, supercomputers has been increased. In order to realize the increased computing speed, a large-capacity data transmission technology is required to input/output large-capacity data from a Central Processing Unit (CPU). In an electrical interconnect technology using, for example, a copper wire, a circuit area, the number of transmission lines, and power consumption are remarkably increased with the increase of data capacity, which may make it difficult to realize a high computing speed. Thus, an optical interconnect technology is known which interconnects CPUs with light. In the optical interconnect technology, an optical transceiver using a silicon photonics (SiPH) technology is being developed which is compact to be suitable for large-scale integration and enables a fusion of electricity and light.

Related technologies are disclosed in, for example, Japanese Laid-Open Patent Publication No. 10-028106, Japanese Laid-Open Patent Publication No. 2000-236299, and Japanese Laid-Open Patent Publication No. 2005-341529.

SUMMARY

According to one aspect of the embodiments, A transceiving system includes: a transmitter; and a receiver coupled to the transmitter via optical transmission lines using optical wavelength multiplexing communication, wherein the transmitter includes: a first processor configured to generate a plurality of division data obtained by dividing data, and transmit the plurality of division data; and a modulator configured to modulate wavelengths of transport lights, which transport the plurality of division data, respectively, based on setting information including a correspondence relationship between identification information identifying each of the optical transmission lines and wavelength information indicating a wavelength, and output lights, each of which is superimposed with the respective division data, to the optical transmission lines, respectively; a second processor configured to transmit changed setting information, which is obtained by changing the setting information, to the receiver, and wherein the receiver includes: a de-multiplexer configured to separate lights input from the optical transmission lines into de-multiplexed lights of a plurality of wavelengths, respectively, based on the changed setting information; and a third processor configured to convert the plurality of de-multiplexed lights into division data, respectively.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a table for explaining an exemplary method of selecting a combination for minimizing power consumption;

FIG. 6 is a table for explaining an exemplary method of selecting a combination for improving reliability while reducing power consumption;

FIG. 7B is a flowchart for explaining an exemplary process of a transmitter;

DESCRIPTION OF EMBODIMENTS

Figure 1:
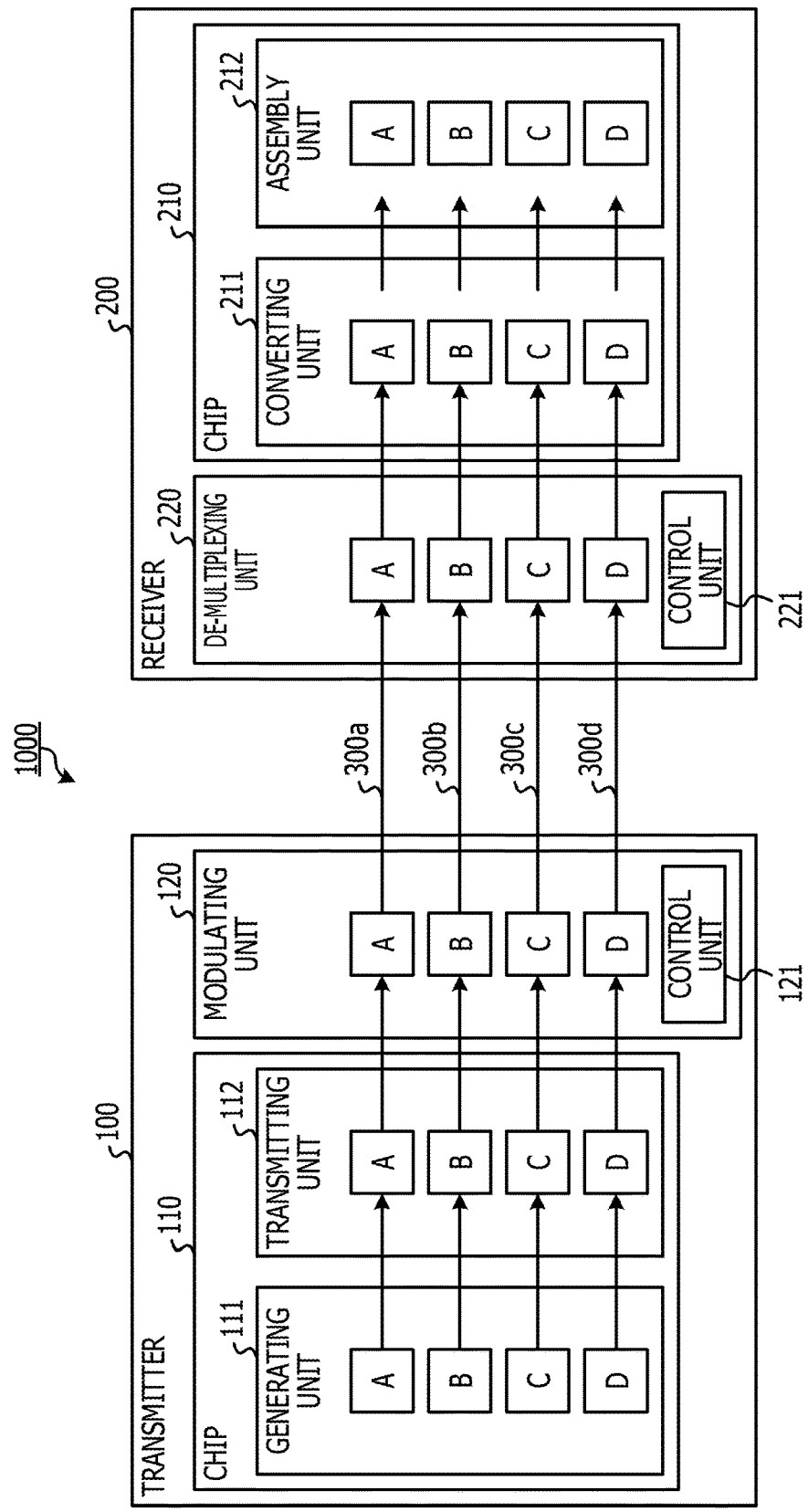
FIG. 1 is a view for explaining an exemplary transceiving system using an optical interconnect technology according to an embodiment.

A transmitter of an optical transceiver includes a light source which emits a light, and an optical modulator which modulates a transport light that carries data in the light. The optical modulator includes a ring modulator advantageous for low power consumption and compactness. The ring modulator has an absorption spectrum in a predetermined free spectral range. The absorption spectrum of the ring modulator has an error due to a production tolerance of optical modulators. Therefore, in the transmitter of the optical transceiver, the ring modulator is heated by a heater to allocate an absorption spectrum of the ring modulator to a wavelength of modulated light. Hereinafter, a wavelength of modulated light may be sometimes referred as a "wavelength of a light to be modulated." The data carried on a light is an electrical signal. The optical modulator varies a refractive index by generating carriers in a PN junction in the resonator with a voltage of the electrical signal as a bias.

Wavelength Division Multiplex (WDM) refers to a method of transmitting a light obtained by superimposing a plurality of wavelength to a single transmission line. When wavelength-multiplexed lights are transmitted between transceivers using the SiPH technology as in the WDM, optical transmission lines (lanes), of which the number corresponds to the number of kinds of wavelengths, are preset between the transceivers. For example, when the lights of four kinds of wavelengths are transmitted/received between the transceivers, four optical transmission lines are preset between the transceivers. While the wavelength-multiplexed lights are transmitted for all of the optical transmission lines, any one of multiplexed wavelengths is modulated and transmitted in each optical transmission line. Meanwhile, it is assumed that a wavelength to be modulated is preset for each optical transmission line.

As a transmission system which conducts optical communication by the wavelength division multiplexing mode, for example, signal light transmission/reception is performed while making transmission characteristics constant among signal lights. The signal lights output from a signal light output unit are multiplexed and some of the multiplexed signal lights are extracted. Signal light power is detected for each wavelength corresponding to a signal light wavelength. Based on the detected signal light power for each wavelength, a signal light output of an optical amplifier for use in amplifying the corresponding wavelength signal light is controlled.

As a technique related to wavelength dispersion, for example, a wavelength dispersion compensation is performed by outputting a light of a wavelength, which has a transmission characteristic optimal to the wavelength dispersion into an optical transmission line, to the optical transmission line without using a wavelength-variable laser. A plurality of light sources outputting lights of different wavelengths is provided, and, before starting the operation of an optical transmission system, a wavelength of a light output to the optical transmission line is varied in order to detect a wavelength having a transmission characteristic optimal to the wavelength dispersion into an optical transmission line. During the operation of the optical transmission system, the light of the detected optimal wavelength is output to the optical transmission line.

In an optical transmission system, for example, a channel is allocated by automating each order of wavelength detection, wavelength setting, and wavelength selection of a plurality of single wavelength lights in an optical transmission system. Based on the power of single wavelengths individually sweep-output from a transmitter which individually outputs the single-wavelength lights, wavelength information of each single-wavelength light is notified to the transmitter. The wavelengths of single wavelength lights output by the transmitter are controlled based on the notified wavelength information.

In an optical transmission line in which wavelength-multiplexed lights obtained by superimposing lights having different wavelengths are transmitted, a wavelength to be modulated in the transmitted lights is preset. Each ring modulator in a transmitter is heated in order to adjust its own absorption spectrum to a wavelength to be modulated. Here, since a combination of a wavelength to be modulated in the wavelength-multiplexed light and an optical transmission line is preset, an amount of power to be used for the heating by a heater may not be considered.

The combination of a wavelength to be modulated in the wavelength-multiplexed light and an optical transmission line may also be changed. However, when the transmitter arbitrarily changes the setting of the wavelength of light to be modulated, the receiver may not restore the modulated wavelength to the original wavelength.

Hereinafter, embodiments will be described in detail with reference to the drawings.

FIG. 1 is a view for explaining an exemplary transceiving system using an optical interconnect technology according to an embodiment. A transceiving system 1000 includes a transmitter 100, a receiver 200, and optical transmission lines 300 (300a to 300d). The transmitter 100 and the receiver 200 are interconnected by the optical transmission lines 300 used for communication using optical wavelength-multiplexing communication.

The transmitter 100 includes a chip 110 and a modulating unit 120. The receiver 200 includes a de-multiplexing unit 220 and a chip 210. The chip 110 and the chip 210 are, for example, CPUs. In the transceiving system 1000 of this embodiment, large capacity data communication and high speed communication are realized by using an optical interconnect for communication between the chip 110 and the chip 210. In order to realize the optical interconnect, the transmitter 100 includes the modulating unit 120 and the receiver 200 includes the de-multiplexing unit 220.

The chip 110 includes a generating unit 111 and a transmitting unit 112. The generating unit 111 generates a plurality of division data obtained by dividing data to be transmitted from the transmitter 100 to the receiver 200. The respective division data are denoted by A to D. The transmitting unit 112 transmits the division data A to D generated in the generating unit 111 to the modulating unit 120. Processes of the generating unit 111 and the transmitting unit 112 are implemented with an operation of a CPU. The process of the generating unit 111 is a process executed in a logic layer of the CPU. A process of the transmitting unit 112 is a process executed in a physical layer of the CPU.

The modulating unit 120 includes a control unit 121. The modulating unit 120 is, for example, a SiPH transmitter. The control unit 121 holds wavelength information indicating a wavelength to be modulated in wavelength-multiplexed lights, and setting information defining a correspondence relationship with identification numbers identifying optical transmission lines. The control unit 121 is, for example, a microcomputer. The control unit 121 holds power consumption information corresponding to a combination of an identification number identifying each optical transmission line and a wavelength to be modulated in each optical transmission line (for more information, see, e.g., FIGS. 5 and 6). The "power consumption" used herein refers to electric energy used for heating by a heater in a ring modulator. Based on the power consumption information, the control unit 121 selects a combination of an identification number identifying each optical transmission line whose power consumption by the heater becomes smaller and a wavelength to be modulated in each optical transmission line, and updates the setting information. Based on the combinations of optical transmission lines and wavelengths to be modulated, which is selected by the control unit 121, the modulating units 120 modulate transport lights of wavelengths carrying division data, respectively, and output lights, each of which is superimposed with division data, to the optical transmission lines, respectively. Meanwhile, a light resonant to the ring modulator is separated and modulated.

In this way, the modulating units 120 are able to reduce the power consumption of the transmitter 100 by selecting a combination of an optical transmission line whose power consumption becomes smaller and a wavelength of light to be modulated and modulating the selected wavelength of light to be modulated. Meanwhile, a combination of an optical transmission line and a wavelength of light to be modulated, which is selected by the control unit 121, may be selected in such a way that the maximum of power consumption in the combination is decreased, or may be optimized in various ways.

However, when a wavelength different from a wavelength provided in the receiver 200 is modulated in the transmitter 100, the receiver 200 may not be able to restore data normally. With this problem, the control unit 121 transmits changed setting information to a control unit 221 of the receiver 200. The control unit 121 and the control unit 221 conduct wireless or wired data communication with each other. Thus, the receiver 200 may be able to determine which wavelength is set for each optical transmission line, and may be able to restore data from received light.

The de-multiplexing unit 220 of the receiver 200 separates a light having a resonating wavelength from the wavelength-multiplexed lights input via the optical transmission lines 300, based on changed setting information (a correspondence relationship between a wavelength of light to be modulated and an optical transmission line). The de-multiplexing unit 220 is implemented with a SiPH receiver. A converting unit 211 converts light output from the de-multiplexing unit 220 into division data. An assembly unit 212 assembles the division data into the original data.

In this way, by selecting the optimal combination of an optical transmission line and a wavelength of light to be modulated, under the control of the control unit 121, the power consumption of the transmitter 100 side may be reduced. Meanwhile, a changing process of the setting information, based on which the control unit 121 selects a combination of an optical transmission line and a wavelength of light to be modulated, may be performed, for example, when the transceiving system 1000 is powered on. In this case, the transceiving system 1000 operates with the same setting until the transceiving system 1000 is powered off. In addition, the changing process of the setting information, based on which the control unit 121 selects a combination of an optical transmission line and a wavelength of light to be modulated, may be regularly performed.

Figure 2:
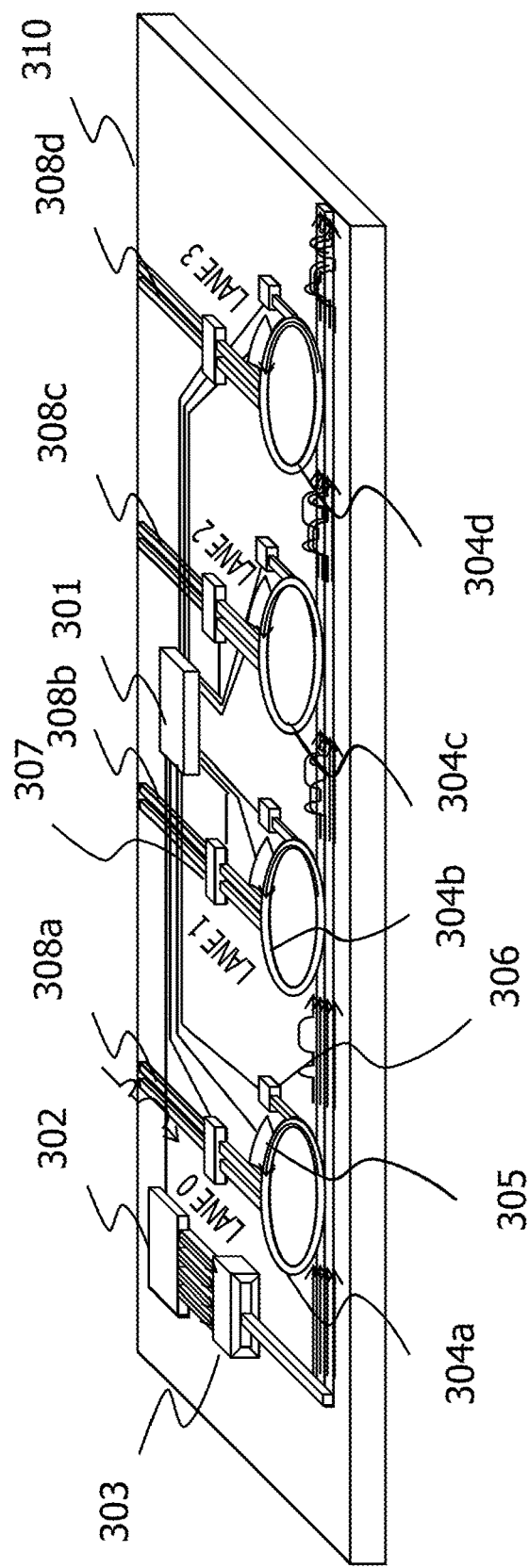
FIG. 2 is a view for explaining an exemplary configuration of a SiPH transmitter.

FIG. 2 is a view for explaining an exemplary configuration of a SiPH transmitter. A SiPH transmitter 310 operates as the modulating unit 120 of FIG. 1. The SiPH transmitter 310 includes a microcomputer 301, an array laser 302, a wavelength division multiplexing-type multiplexer (WDM-MUX) 303, a ring modulator 304 (e.g., ring modulators 304a to 304d), a heater 305, a monitor photodiode 306, a driver 307, and a lane 308 (e.g., lanes 308a to 308d). The microcomputer 301 operates as the control unit 121 of FIG. 1. The array laser 302 is a light source that outputs lights of different wavelengths, the number of which is the same as that number of the lanes 308a to 308d. The array laser 302 is installed to be oscillated at different wavelengths by a diffraction grating (distribution feedback). The WDMMUX 303 is a device which collects input lights of different wavelengths into a single waveguide so as to transmit the input lights. The ring modulator 304 separates a light of a wavelength to be modulated from the wavelength-multiplexed lights, generates a carrier in a PN junction in the modulator with a voltage of an electrical signal as a bias, and modulates the separated light by varying a refractive index. The heater 305 is used to heat the ring modulator 304 in order to match a ring modulation wavelength and a light wavelength in the waveguide to each other. The monitor photodiode 306 is used to determine whether or not the ring modulation wavelength and the light wavelength in the waveguide are matched to each other. The driver 307 is an amplifier which converts an electrical signal, which is data transmitted from the chip 110, into a bias voltage of the ring modulator 304. The microcomputer 301 controls the power of the heaters 305 such that the output of the monitor photodiode 306 becomes constant by adjusting the oscillation wavelength of the ring modulator 304. In addition, the microcomputer 301 initializes various devices in the SiPH transmitter 310. The division data A to D of FIG. 1 are transmitted to the receiver via the lanes 308a to 308d, respectively.

Figure 3:
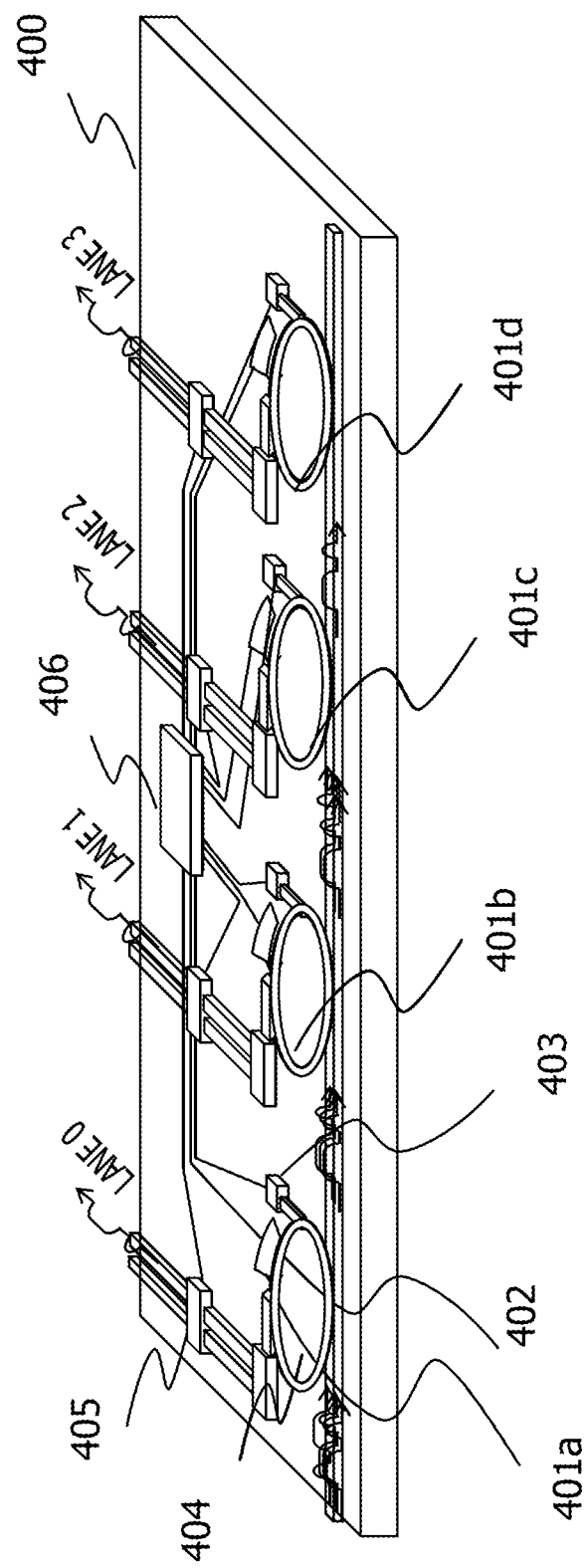
FIG. 3 is a view for explaining an exemplary configuration of a SiPH receiver.

FIG. 3 is a view for explaining an exemplary configuration of a SiPH receiver. A SiPH receiver 400 operates as the de-multiplexing unit 220 of FIG. 1. The SiPH receiver 400 includes a de-multiplexer 401 (e.g., de-multiplexers 401a to 401d), a heater 402, a monitor photodiode 403, a photodiode 404, a TIA/LIM (Trans Impedance Amp/Limiting Amp) 405, and a microcomputer 406. The microcomputer 406 operates as the control unit 221 of FIG. 1. The de-multiplexer 401 separates a light having a wavelength to be modulated from the wavelength-multiplexed optical signals and inputs the separated light to the photodiode 404. The heater 402 may be the same as the heater 302 illustrated in FIG. 2. The monitor photodiode 403 may be the same as the monitor photodiode 303 illustrated in FIG. 2. The photodiode 404 converts the modulated light into an electrical signal. The TIA of the TIA/LIM 405 refers to a pre-amplifier that converts a photodiode current into a voltage. The LIM of the TIA/LIM 405 refers to a post-amplifier which sets an output amplitude to fit the chip of the reception side.

Figure 4:
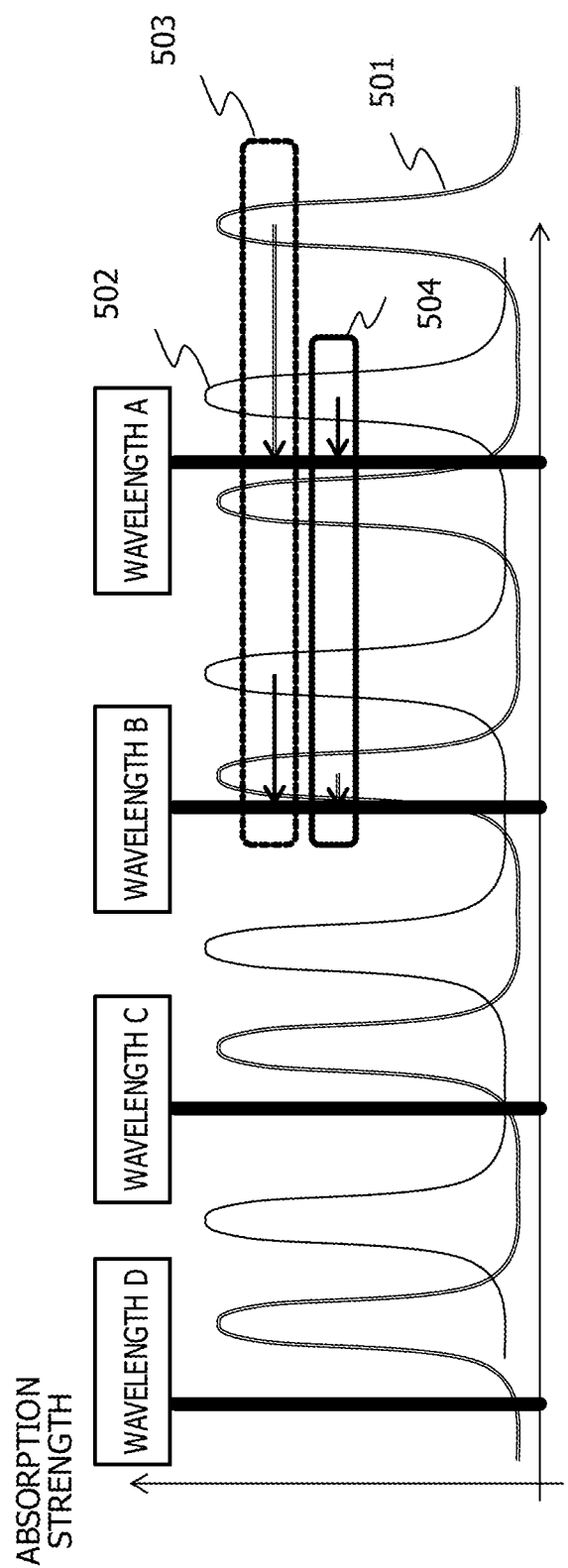
FIG. 4 is a view for explaining an exemplary relationship between a wavelength and absorption spectrum in a wavelength division multiplexing mode.

FIG. 4 is a graph for explaining an exemplary relationship between a wavelength and an absorption spectrum in a wavelength division multiplexing mode. In the graph illustrated in FIG. 4, a vertical axis represents absorption strength of an absorption spectrum and a horizontal axis represents a wavelength. In the graph illustrated in FIG. 4, four wavelengths A to D output from the array laser 302 of the SiPH transmitter 310 in a wavelength division multiplexing mode are illustrated. The wavelengths A to D are exemplary wavelengths to be modulated. The wavelengths A to D to be modulated are wavelengths selected based on the electrical signals of the division data A to D. The graph illustrated in FIG. 4 also illustrates an exemplary a relationship between a wavelength and absorption strength of each of an absorption spectrum 501 and an absorption strength 502 of the ring modulators 304. For example, the absorption spectrum 501 is an exemplary relationship between a wavelength and absorption strength of the ring modulator 304a. The absorption spectrum 502 is an exemplary relationship between a wavelength and absorption strength of the ring modulator 304b.

For example, when the light having the wavelength A is to be modulated in the ring modulator 304a, the microcomputer 301 controls the heater to heat the ring modulator 304a. Then, the rightmost peak of the absorption spectrum 501 of the ring modulator 304a is adjusted to be matched to the wavelength A. When the absorption spectrum 501 of the ring modulator 304a is matched to the wavelength A, the light having the wavelength A is separated from the wavelength-multiplexed lights and modulated. Likewise, when the light having the wavelength B is to be modulated in the ring modulator 304b, the microcomputer 301 controls the heater to heat the ring modulator 304b. Then, the second peak from the right of the absorption spectrum 502 of the ring modulator 304b is adjusted to be matched to the wavelength B. A combination of the absorption spectrum 501 of the ring modulator 304a and the wavelength A to be modulated and a combination of the absorption spectrum 502 of the ring modulator 304b and the wavelength B to be modulated are indicated by a case 503. Arrows in the case 503 indicates adjustment widths of the absorption spectrum 501 and the absorption spectrum 502 each of which is adjusted by the heating of the heater. The adjustment widths correspond to power consumption.

As another example, when the light having the wavelength A is to be modulated in the ring modulator 304b, the microcomputer 301 controls the heater to heat the ring modulator 304b. Then, the rightmost peak of the absorption spectrum 502 of the ring modulator 304b is adjusted to match the wavelength A. When the light having the wavelength B is to be modulated in the ring modulator 304a, the microcomputer 301 controls the heater to heat the ring modulator 304a. Then, the second peak from the right of the absorption spectrum 501 of the ring modulator 304a is adjusted to be matched to the wavelength B. A combination of the absorption spectrum 502 of the ring modulator 304b and the wavelength A and a combination of the absorption spectrum 501 of the ring modulator 304a and the wavelength B are indicated by a case 504. Arrows in the case 504 indicate adjustment widths of the absorption spectrum 501 and the absorption spectrums 502 each of which is adjusted by the heating of the heater. The adjustment widths correspond to power consumption.

As illustrated in the case 503, when the light of the wavelength A is to be modulated in the ring modulator 304a and the light having the wavelength B is to be modulated in the ring modulator 304b, the power consumption is large. By changing this setting to a setting in which the light having the wavelength A is to be modulated in the ring modulator 304b and the light having the wavelength B is to be modulated in the ring modulator 304a, as illustrated in the case 504, the power consumption is capable of being reduced.

FIG. 5 illustrates tables for explaining an exemplary method of selecting a combination for minimizing power consumption. A power consumption table 601 represents exemplary power consumption in each of combinations of ring modulators 304a to 304d of the modulating unit 120 and wavelengths A to D to be modulated. Numbers 1 to 4 of the modulating unit 120 correspond to the ring modulators 304a to 304d of FIG. 2, respectively. Power consumption in a case where an absorption spectrum of No. 1 of the modulating unit 120 (e.g., the ring modulator 304a) is adjusted to each of the wavelengths A to D is actually measured and stored in the power consumption table 601. In order to adjust the absorption spectrum of No. 1 of the modulating unit 120 to the wavelength A, for example, power of 30 mW is used. In order to adjust the absorption spectrum of No. 1 of the modulating unit 120 to the wavelength B, for example, power of 14 mW is used. In order to adjust the absorption spectrum of No. 1 of the modulating unit 120 to the wavelength C, for example, power of 28 mW is used. In order to adjust the absorption spectrum of No. 1 of the modulating unit 120 to the wavelength D, for example, power of 1 mW is used. Likewise, power consumption in a case where an absorption spectrum of No. 2 of the modulating unit 120 (e.g., the ring modulator 304b) is adjusted to each of the wavelengths A to D is actually measured and stored in the power consumption table 601. Power consumption in a case where an absorption spectrum of No. 3 of the modulating unit 120 (e.g., the ring modulator 304c) is adjusted to each of the wavelengths A to D is actually measured and stored in the power consumption table 601. Power consumption in a case where an absorption spectrum of No. 4 of the modulating unit 120 (e.g., the ring modulator 304d) is adjusted to each of the wavelengths A to D is actually measured and stored in the power consumption table 601. In this way, the control unit 121 generates the power consumptions in all the combinations of the absorption spectrums of the modulating unit 120 and the wavelengths A to D when the transmitter 100 is powered on.

A power consumption table 602 represents an exemplary power consumption in each of the combinations of de-multiplexers 401a to 401d of the de-multiplexing unit 220 and the wavelengths A to D. For example, numbers 1 to 4 of the de-multiplexing unit 220 may correspond to the de-multiplexers 401a to 401d of FIG. 3, respectively. Power consumption in a case where an absorption spectrum of No. 1 of the de-multiplexing unit 220 (e.g., the de-multiplexer 401a) is adjusted to each of the wavelengths A to D is actually measured and stored in the power consumption table 602. In order to adjust the absorption spectrum of No. 1 of the de-multiplexing unit 220 to the wavelength A, for example, power of 15 mW is used. In order to adjust the absorption spectrum of No. 1 of the de-multiplexing unit 220 to the wavelength B, for example, power of 7 mW is used. In order to adjust the absorption spectrum of No. 1 of the de-multiplexing unit 220 to the wavelength C, for example, power of 27 mW is used. In order to adjust the absorption spectrum of No. 1 of the de-multiplexing unit 220 to the wavelength D, for example, power of 10 mW is used. Likewise, power consumption in a case where an absorption spectrum of No. 2 of the de-multiplexing unit 220 (e.g., the de-multiplexer 401b) is adjusted to each of the wavelengths A to D is actually measured and stored in the power consumption table 602. Power consumption in a case where an absorption spectrum of No. 3 of the de-multiplexing unit 220 (e.g., the de-multiplexer 401c) is adjusted to each of the wavelengths A to D is actually measured and stored in the power consumption table 602. Power consumption in a case where an absorption spectrum of No. 4 of the de-multiplexing unit 220 (e.g., the de-multiplexer 401d) is adjusted to each of the wavelengths A to D is actually measured and stored in the power consumption table 602. In this way, the control unit 221 generates the power consumptions in all the combinations of the absorption spectrums of the de-multiplexing unit 220 and the wavelengths A to D when the receiver 200 is powered on.

Each of a power consumption table 603 and a power consumption table 604 represents exemplary power consumption in each of combinations of lane numbers and the wavelengths A to D. For example, lane numbers 1 to 4 may correspond to the optical transmission lines 300a to 300d of FIG. 1, respectively. Lane No. 1 (the optical transmission line 300a) is used for optical communication between No. 1 of the modulating unit 120 and No. 1 of the de-multiplexing unit 220. In each of the power consumption table 603 and the power consumption table 604, power consumption in a combination of lane No. 1 and the wavelengths A to D is the sum of power consumption of the modulating unit 120a and power consumption of the de-multiplexing unit 220a corresponding to the lane number. For example, the sum of the power consumption to adjust No. 1 of the modulating unit 120 to the wavelength A and the power consumption to adjust No. 1 of the de-multiplexing unit 220 to the wavelength A is stored, as the power consumption corresponding to the wavelength A of lane No. 1, in each of the power consumption table 603 and the power consumption table 604. Likewise, in each of the power consumption table 603 and the power consumption table 604, power consumption in a combination of lane No. 2 and the wavelengths A to D is the sum of power consumption of the modulating unit 120b and power consumption of the de-multiplexing unit 220b corresponding to the lane number. In each of the power consumption table 603 and the power consumption table 604, the power consumption in a combination of lane No. 3 and the wavelengths A to D is the sum of power consumption of the modulating unit 120c and power consumption of the de-multiplexing unit 220c corresponding to the lane number. In each of the power consumption table 603 and the power consumption table 604, power consumption in a combination of lane No. 4 and the wavelengths A to D is the sum of power consumption of the modulating unit 120d and power consumption of the de-multiplexing unit 220d corresponding to the lane number.

In the exemplary power consumption table 604, it is preset that the light of wavelength A is transmitted in lane No. 1, the light of wavelength B is transmitted in lane No. 2, the light of wavelength C is transmitted in lane No. 3, and the light of the wavelength D is transmitted in lane No. 4. In this example, the total power consumption of the transmitter 100 and the receiver 200 is 128 mW, which is obtained by summing 45, 26, 18, and 39.

The power consumption table 603 is an exemplary case where a combination of minimizing power consumption is selected from all the power consumptions of the power consumption table 603. The combination minimizing the power consumption is selected by the control unit 121 from all the combinations of the power consumption table 603. In the exemplary power consumption table 603, the control unit 121 selects a transmission lane for each wavelength in such a way that the light of wavelength A is transmitted in lane No. 3, the light of wavelength B is transmitted in lane No. 1 of the lane, the light of wavelength C is transmitted in lane No. 4, and the light of wavelength D is transmitted in the lane No. 2. In this case, the total power consumption of the transmitter 100 and the receiver 200 is 67 mW that is obtained by summing 2, 21, 29, and 15.

In this way, the control unit 121 selects the optimal (minimal) combination with low power consumption from all the combinations of wavelengths to be modulated and lanes when the power of the transmitter 100 and the receiver 200 is on. Thus, the combination selected by the control unit 121 in operation may be used to conduct communication between the transmitter 100 and the receiver 200, thereby reducing the power consumptions of the transmitter 100 and the receiver 200. The information of the power consumption table 601 and the power consumption table 602 is shared by the control unit 121 and the control unit 221.

FIG. 6 is a table for explaining an exemplary method of selecting a combination for improving reliability while reducing power consumption. In FIG. 6, an exemplary method of selecting a combination that is different from a combination in which the power consumption is low will be described by using a power consumption table 701 and a power consumption table 702. The power consumption table 701 is an exemplary power consumption for each of combinations of the modulating unit 120 and wavelengths A to D. For example, numbers 1 to 4 of the modulating unit 120 may correspond to the ring modulators 304a to 304d of FIG. 2, respectively. The power consumption in a case where an absorption spectrum of No. 1 of the modulating unit 120 (e.g., the ring modulator 304a) is adjusted to each of wavelengths A to D is actually measured and stored in the power consumption table 701. When an absorption spectrum of a ring modulator is matched to a wavelength to be modulated, the modulated light is able to be separated from multiplexing-modulated light. Likewise, the power consumption in a case where an absorption spectrum of No. 2 of the modulating unit 120 (e.g., the ring modulator 304b) is adjusted to each of wavelengths A to D is actually measured and stored in the power consumption table 701. The power consumption in a case where an absorption spectrum of No. 3 of the modulating unit 120 (e.g., the ring modulator 304c) is adjusted to each of wavelengths A to D is actually measured and stored in the power consumption table 701. The power consumption in a case where an absorption spectrum of No. 4 of the modulating unit 120 (e.g., the ring modulator 304d) is adjusted to each of wavelengths A to D is actually measured and stored in the power consumption table 701. In this way, the control unit 121 generates the power consumptions in all the combinations of the absorption spectrums of the modulating unit 120 and wavelengths A to D when the transmitter 100 is powered on.

The power consumption table 702 is an exemplary power consumption for each of combinations of the de-multiplexing unit 220 and wavelengths A to D. For example, numbers 1 to 4 of the de-multiplexing unit 220 may correspond to the de-multiplexers 401a to 401d of FIG. 3, respectively. The power consumption in a case where an absorption spectrum of No. 1 of the de-multiplexing unit 220 (e.g., the de-multiplexer 401a) is adjusted to each of wavelengths A to D is actually measured and stored in the power consumption table 702. Likewise, the power consumption in a case where an absorption spectrum of No. 2 of the de-multiplexing unit 220 (e.g., the de-multiplexer 401b) is adjusted to each of wavelengths A to D is actually measured and stored in the power consumption table 702. The power consumption in a case where an absorption spectrum of No. 3 of the de-multiplexing unit 220 (e.g., the de-multiplexer 401c) is adjusted to each of wavelengths A to D is actually measured and stored in the power consumption table 702. The power consumption in a case where an absorption spectrum of No. 4 of the de-multiplexing unit 220 (e.g., the de-multiplexer 401d) is adjusted to each of wavelengths A to D is actually measured and stored in the power consumption table 702. In this way, the control unit 121 generates the power consumptions in all the combinations of the absorption spectrums of the de-multiplexing unit 220 and wavelengths A to D when the receiver 200 is powered on.

The control unit 121 selects the optimal combination from the combinations of the modulating unit 120 and wavelengths and the combinations of the de-multiplexing unit 220 and wavelengths. Here, when a combination with high power consumption exists among the combinations selected by the control unit 121, the modulating unit 120, the de-multiplexing unit 220, and a device existing near the units are exposed to a high operation environment temperature for a long time during the product operation. In particular, for example, a semiconductor device or a photonic device is deteriorated in reliability under a high temperature environment. Therefore, in the example of FIG. 6, the control unit 121 selects a combination with the smallest maximum power consumption of each heater from the combinations of the modulating unit 120 and wavelengths and the combinations of the de-multiplexing unit 220 and wavelengths.

The control unit 121 selects a combination with the smallest maximum power consumption of the modulating unit 120 and the de-multiplexing unit 220 from combinations of the power consumption table 701 and the power consumption table 702. For example, the control unit 121 selects a combination of No. 3 of the modulating unit 120 and wavelength A, a combination of No. 4 of the modulating unit 120 and wavelength B, a combination of No. 2 of the modulating unit 120 and wavelength C, and a combination of No. 1 of the modulating unit 120 and wavelength D from the power consumption table 701. The control unit 121 selects a combination of No. 3 of the de-multiplexing unit 220 and wavelength A, a combination of No. 4 of the de-multiplexing unit 220 and wavelength B, a combination of No. 2 of the de-multiplexing unit 220 and wavelength C, and a combination of No. 1 of the de-multiplexing unit 220 and wavelength D from the power consumption table 702. Then, the maximum power consumption of the modulating unit 120 and the de-multiplexing unit 220 becomes 22 mW, thereby decreasing the maximum power consumption in each ring modulator.

In this way, the control unit 121 selects a combination with decreased maximum power consumption in each ring modulator from all the combinations of wavelengths to be modulated and lanes and then uses the selected combination to conduct communication so that the reliability of a semiconductor device, a photonic device or the like may be prevented from being deteriorated.

Figure 7A:
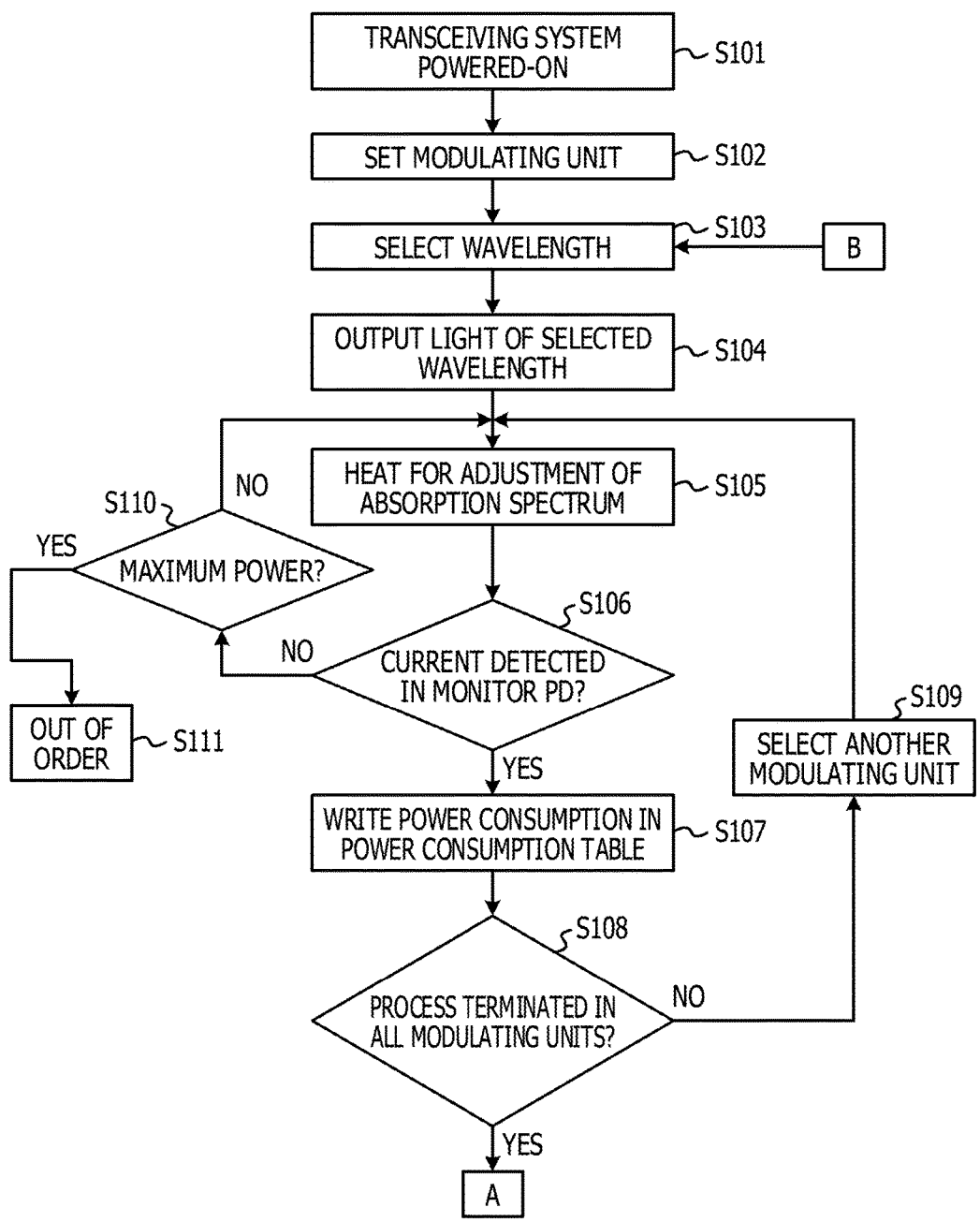
FIG. 7A is a flowchart for explaining an exemplary process of a transmitter.

FIGS. 7A and 7B are flowcharts for explaining an exemplary process performed by a transmitter. The transceiving system 1000 is powered on (Step S101). The control unit 121 performs settings related to the modulating unit 120 (Step S102). The control unit 121 selects a specific wavelength (any of wavelengths A to D) to be output to the array laser 302 (Step S103). The array laser 302 outputs the light of the wavelength selected by the control unit 121 (Step S104). The heater 305 heats the modulating unit 120 to adjust an absorption spectrum (Step S105). The control unit 121 determines whether or not a certain current is detected in the monitor photodiode 306 (Step S106). When it is determined that the certain current is detected in the monitor photodiode 306 (YES in Step S106), the control unit 121 writes power consumption for a combination of a wavelength of the light output from the array laser 302 and the modulating unit 120 in a power consumption table (Step S107). The control unit 121 determines whether or not the process of Steps S105 to S107 have been performed for a light of one wavelength for all modulating units 120 (Step S108). When it is determined that the process have not been completed for light of one wavelength for all modulating units 120 (NO in Step S108), the control unit 121 selects another modulating unit 120 and repeats the process from Step 105 (Step S109). When it is determined that the certain current is not detected in the monitor photodiode 306 (NO in Step S106), the control unit 121 determines whether or not power set in the heater is maximal (Step S110). When it is determined that the power set in the heater is maximal (YES in Step S110), the control unit 121 determines that the modulating unit 120 is out of order (Step S111). When the modulating unit 120 is out of order, the process of the transmitter 110 is ended. When it is determined that the power set in the heater is not maximal (NO in Step S110), the control unit 121 repeats the process from Step S105.

The control unit 121 notifies the control unit 221 that the acquisition of power consumption in the combination of light of one wavelength and each modulating unit 120 has been terminated (Step S112). The control unit 121 receives a notification indicating that the process of the control unit 221 has been completed (Step S113). The notifications of Steps S112 and S113 are made using a communication method such as, for example, Inter Integrated Circuit (I2C). The control unit 121 determines whether or not the process of Steps S104 to S113 has been completed for all the wavelengths (wavelengths A to D of WDM) (Step S114). When it is determined that the process has not been completed for all wavelengths (NO in Step S114), the control unit 121 repeats the process from Step S103.

When it is determined that the process has been completed for all the wavelengths (YES in Step S114), the control unit 121 receives a power consumption table of the receiver 200 from the control unit 221 (Step S115). The control unit 121 selects the optimal combination of a wavelength of light to be modulated and an optical transmission line from the power consumption tables of the transmitter 100 and the receiver 200 (Step S116). The control unit 121 notifies the control unit 221 of the optimal combination (Step S117). The control unit 121 reflects the optimal combination in setting information (Step S118). The control unit 121 terminates the initialization process (Step S119). These processes may be performed at the time of power-on and the used light may not be that subjected to WDM (Wavelength Division Multiplexing).

Figure 8A:
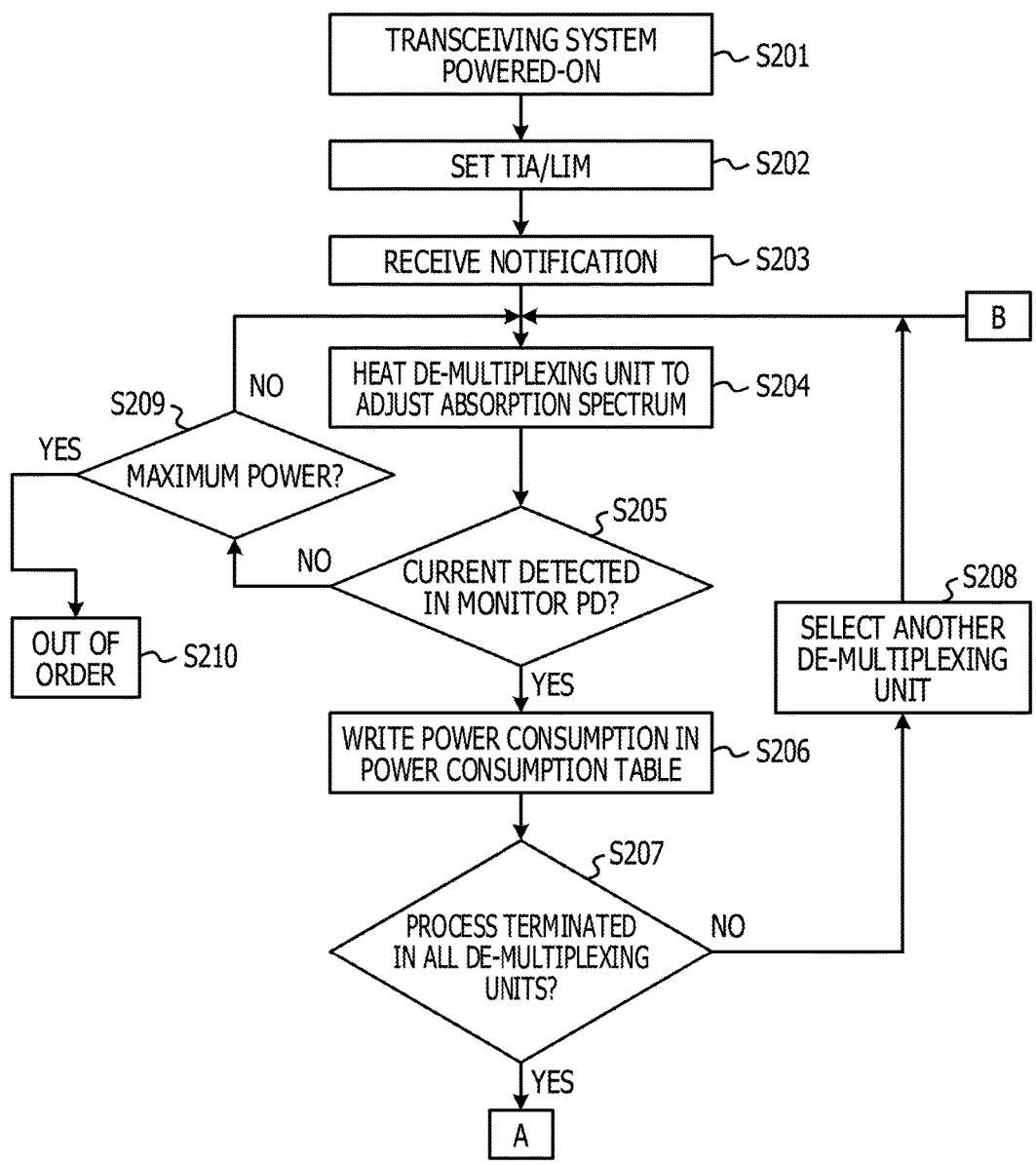
FIG. 8A is a flowchart for explaining an exemplary process of a receiver.
Figure 8B:
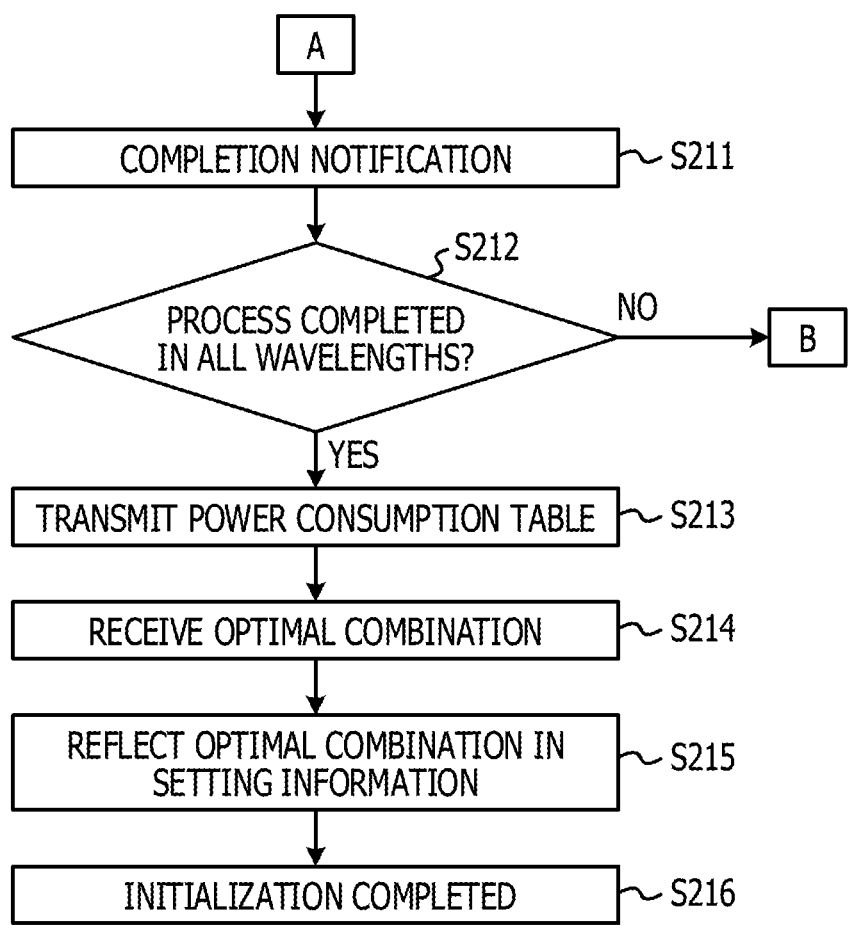
FIG. 8B is a flowchart for explaining an exemplary process of a receiver.

FIGS. 8A and 8B are flowcharts for explaining an exemplary process performed by a receiver. The transceiving system 1000 is powered on (Step S201). The control unit 221 performs settings related to the TIA/LIM 405 (Step S202). The control unit 221 receives a notification indicating that the acquisition of power consumption in the combination of light of one wavelength and each modulating unit 120 has been terminated in the transmitter 100 (Step S203). The notification received by the control unit 221 in Step S203 is one notified from the control unit 121 of the transmitter 100 in the process of Step S112. The heater 402 heats the de-multiplexing unit 220 to adjust an absorption spectrum (Step S204). The control unit 221 determines whether or not a certain current is detected in the monitor photodiode 403 (Step S205). When it is determined that the certain current is detected in the monitor photodiode 403 (YES in Step S205), the control unit 221 writes power consumption for a combination of a wavelength of the light output from the array laser 302 and the de-multiplexing unit 220 in a power consumption table (Step S206). The control unit 221 determines whether or not a process of Steps S204 to S206 have been performed for light of one wavelength for all de-multiplexing units 220 (Step S207). When it is determined that the process have not been completed for light of one wavelength for all de-multiplexing units 220 (NO in Step S207), the control unit 221 selects another de-multiplexing unit 220 and repeats the process from Step 204 (Step S208). When it is determined that the certain current is not detected in the monitor photodiode 403 (NO in Step S205), the control unit 221 determines whether or not power set in the heater is maximal (Step S209). When it is determined that the power set in the heater is maximal (YES in Step S209), the control unit 221 determines that the de-multiplexing unit 220 is out of order (Step S210). When the de-multiplexing unit 220 is out of order, the control unit 221 terminates the process. When it is determined that the power set in the heater is not maximal (NO in Step S209), the control unit 221 repeats the process from Step S204.

The control unit 221 notifies the control unit 121 that the acquisition of power consumption in the combination of light of one wavelength and each de-multiplexing unit 220 has been terminated (Step S211). The notification of Step S211 is made using a communication means such as I2C. The control unit 221 determines whether or not the process of Steps S203 to S211 has been completed for all wavelengths (wavelengths A to D of WDM) (Step S212). When it is determined that the process has not been completed for all wavelengths (NO in Step S212), the control unit 221 repeats the process from Step S204.

When it is determined that the process has been completed for all wavelengths (YES in Step S212), the control unit 221 transmits the power consumption table to the control unit 121 (Step S213). The control unit 221 receives the optimal combination of a wavelength of light to be modulated and an optical transmission line from the control unit 121 (Step S214). The control unit 221 reflects the optimal combination in setting information (Step S215). The control unit 221 terminates the initialization process (Step S216).

In this way, by selecting the optimal combination of an optical transmission line and a wavelength of light to be modulated under control of the control unit 121, it is possible to reduce the power consumption of the transmitter 100. On the other hand, a process of changing the setting information to allow the control unit 121 to select a combination of an optical transmission line and a wavelength of light to be modulated may be performed, for example, when the transceiving system 1000 is powered on. In this case, the transceiving system 1000 operates with the same setting until the transceiving system 1000 is powered off. Alternatively, this changing process of the setting information in which the control unit 121 selects the combination of the optical transmission line and the wavelength of light to be modulated may be regularly performed.

Figure 9:
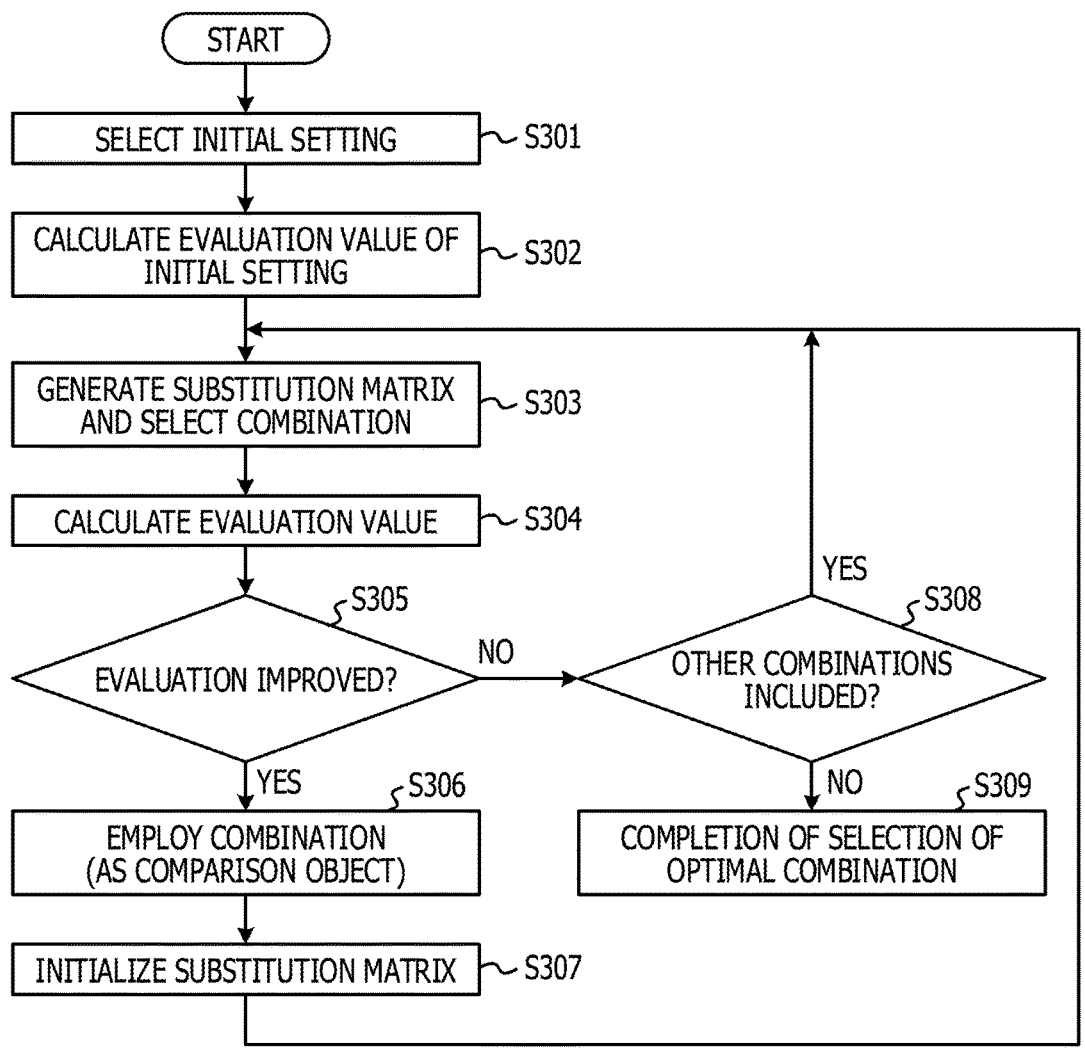
FIG. 9 is a flowchart for explaining an exemplary process of selecting an optimal combination.

FIG. 9 is a flowchart for explaining an exemplary process of selecting the optimal combination. The process of Step S116 of the control unit 121, which is illustrated in FIG. 7B, will be described in more detail with reference to the flowchart of FIG. 9. The control unit 121 selects setting information (hereinafter referred to as an initial setting) which is a preset combination of a wavelength of light to be modulated and an optical transmission line (Step S301). The control unit 121 calculates an evaluation value of the initial setting (Step S302). When the sum of power consumptions of the heater in the optimal combination is small, the sum of power consumption of the heater of the transmitter 100 and power consumption of the heater of the receiver 200 of the combination in the initial setting is used as the evaluation value. When the maximum power consumption of the heater is decreased in the optical combination, the maximum power consumption of the heater of the transmitter 100 and the receiver 200 of the combination in the initial setting is used as the evaluation value.

The control unit 121 generates a substitution matrix of combinations of wavelengths of light to be modulated and optical transmission lines and selects one combination (Step S303). The control unit 121 calculates an evaluation value in the selected combination (Step S304). The control unit 121 compares the evaluation value in Step S302 with the evaluation value in Step S304 so as to determine whether or not the evaluation value is improved (Step S305). When it is determined that the evaluation value of the selected combination is better (YES in Step S305), the control unit 121 uses the selected combination and the evaluation value as a comparison object (Step S306). The control unit 121 initializes the substitution matrix and repeats the process from Step S303 (Step S307).

When it is determined that the evaluation value of the selected combination is worse (NO in Step S305), the control unit 121 determines whether or not other combinations are included in the substitution matrix (Step S308). When it is determined that other combinations are included in the substitution matrix (YES in Step S308), the control unit 121 repeats the process from Step S303. When it is determined that other combinations are not included in the substitution matrix (NO in Step S308), the control unit 121 selects the selected combination as the optimal combination (Step S309).

In this way, by selecting the optimal combination of an optical transmission line and a wavelength of light to be modulated under control of the control unit 121, the power consumption of the transmitter 100 may be reduced.

<Other Examples of Communication Between Control Units>

Figure 10:
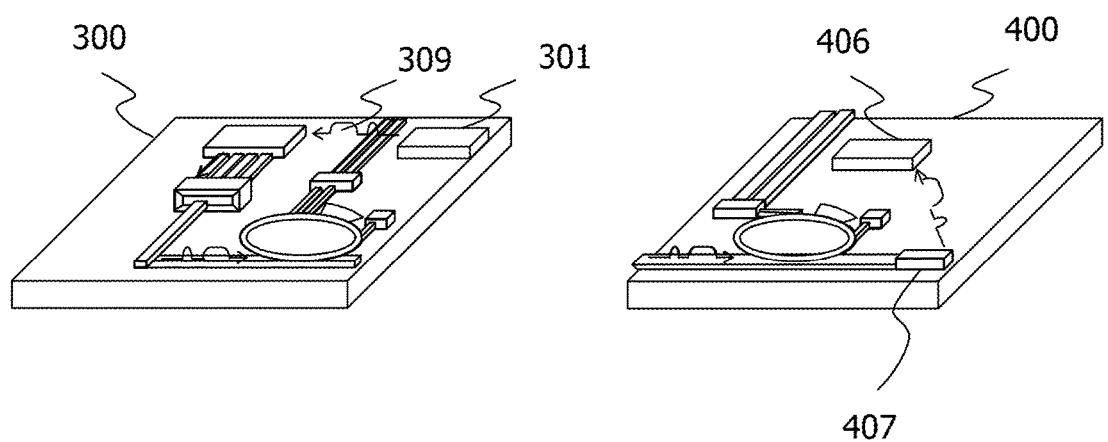
FIG. 10 is a view for explaining another example of communication between control units.

FIG. 10 is a view for explaining another example of communication between the control units. In FIG. 10, the same elements of SiPH transmitter 310 and SiPH receiver 400 as those of FIGS. 2 and 3 are denoted by the same reference numerals. For notifications (e.g., Steps S112, S117, S211 and S213) between the microcomputer 301 and the microcomputer 406, a control signal superimposed on a power line of the array laser 302 is transmitted to the SiPH receiver 400.

The microcomputer 301 transmits a control signal for notifying the microcomputer 406 of information to the power line of the array laser 302 (see an arrow 309). The control signal is transmitted to the SiPH receiver 400 via an optical transmission line. The SiPH receiver 400 includes a photodiode 407 for transmitting the control signal to the microcomputer 406 in the end of the de-multiplexer 401. In this communication method, no ring resonator may be used to transmit the control signal.

Figure 11:
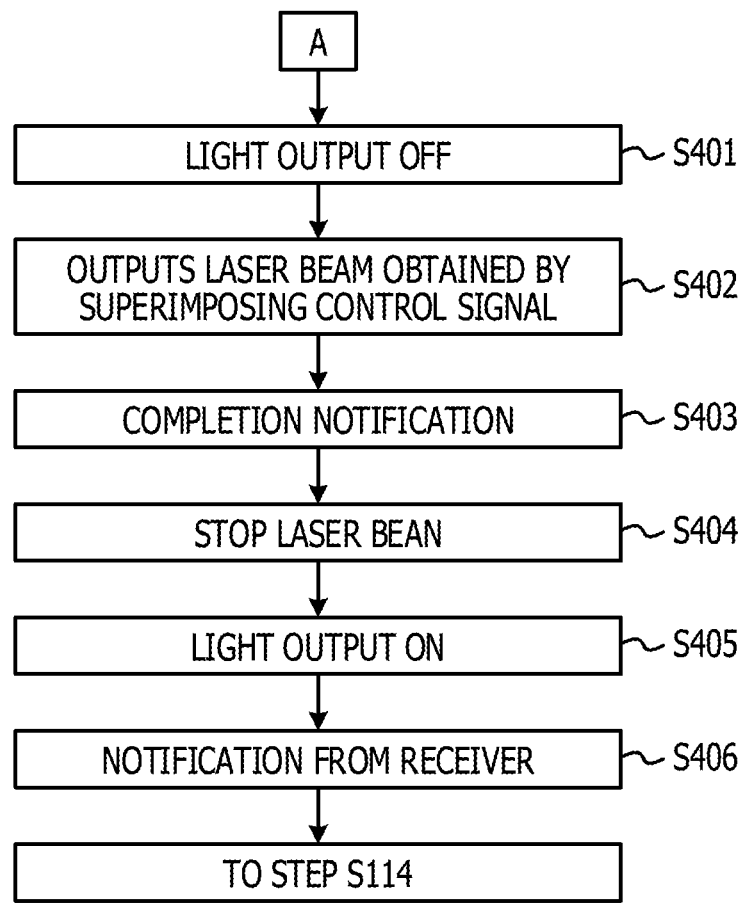
FIG. 11 is a flowchart for explaining another example of communication between control units.

FIG. 11 is a flowchart for explaining another example of communication between the control units. The flowchart of FIG. 11 illustrates a process performed after Step S108 of FIG. 7A. The control unit 121 stops light that is being output from the array laser 302 (Step S401). The control unit 121 outputs a laser beam obtained by superimposing a control signal on the light of the array laser 302 (Step S402). The control unit 121 uses the laser beam to notify the control unit 221 that the acquisition of power consumption in a combination of light of one wavelength and each modulating unit 120 has been terminated (Step S403). The control unit 121 controls the array laser 302 to stop the laser beam (Step S404). The control unit 121 resumes the output of the light of the array laser 302 (Step S405). The control unit 121 receives a notification indicating that the process of the control unit 221 has been completed (Step S406).

In this communication method, no ring resonator may be used in order to transmit the control signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transceiving system comprising:
a transmitter; and
a receiver coupled to the transmitter via optical transmission lines using optical wavelength multiplexing communication,
the transmitter includes:
a first processor configured to generate a plurality of division data obtained by dividing data, and transmit the plurality of division data;
a modulator configured to modulate wavelengths of transport lights, which transport the plurality of division data, respectively, based on setting information including a correspondence relationship between identification information identifying each of the optical transmission lines and wavelength information indicating a wavelength, and output lights, each of which is superimposed with the respective division data, to the optical transmission lines, respectively; and
a second processor configured to transmit changed setting information, which is obtained by changing the setting information, to the receiver, and the receiver includes:

a de-multiplexer configured to separate lights input from the optical transmission lines into de-multiplexed lights of a plurality of wavelengths, respectively, based on the changed setting information; and a third processor configured to convert the plurality of de-multiplexed lights into division data, respectively, and the second processor is configured to:

acquire first power consumption information used for a modulating process of the modulator and second power consumption information used for a separating process of the de-multiplexer;

define a correspondence relationship between identification information of the optical transmission line in which a sum of the first power consumption and the second power consumption is decreased and the wavelength information; and change the setting information.

2. A transceiving system according to claim 1, comprising:

a transmitter; and a receiver coupled to the transmitter via optical transmission lines using optical wavelength multiplexing communication, the transmitter includes:

a first processor configured to generate a plurality of division data obtained by dividing data, and transmit the plurality of division data;

a modulator configured to modulate wavelengths of transport lights, which transport the plurality of division data, respectively, based on setting information including a correspondence relationship between identification information identifying each of the optical transmission lines and wavelength information indicating a wavelength, and output lights, each of which is superimposed with the respective division data, to the optical transmission lines, respectively; and a second processor configured to transmit changed setting information, which is obtained by changing the setting information, to the receiver, the receiver includes:

a de-multiplexer configured to separate lights input from the optical transmission lines into de-multiplexed lights of a plurality of wavelengths, respectively, based on the changed setting information; and a third processor configured to convert the plurality of de-multiplexed lights into division data, respectively, and the second processor is configured to:

acquire first power consumption information used for a modulating process of the modulator and second power consumption information used for a separating process of the de-multiplexer;

define a correspondence relationship between identification information of the optical transmission lines in which a maximum of the first power consumption and the second power consumption is decreased and the wavelength information; and change the setting information.

3. The transceiving system according to claim 1, wherein the third processor is configured to assemble the division data, which are converted from the de-multiplexed lights into the data.

4. A transmitter comprising:

a first processor configured to generate a plurality of division data obtained by dividing data, and transmit the plurality of generated division data;

a modulator configured to modulate wavelengths of transport lights, which transport the plurality of division data, respectively, based on setting information including a correspondence relationship between identification information identifying each of optical transmission lines and wavelength information indicating a wavelength, and output lights, each of which is superimposed with the respective division data, to the optical transmission lines, respectively; and a second processor configured to transmit changed setting information, which is obtained by changing the setting information, to a receiver coupled to the transmitter via the optical transmission lines by optical wavelength multiplexing communication, the second processor is configured to:

acquire first power consumption information used for a modulating process of the modulator and second power consumption information used for a de-multiplexing process of a de-multiplexer in the receiver that separates lights input from the optical transmission lines into de-multiplexed lights of a plurality of wavelengths, respectively, based on the changed setting information;

define a correspondence relationship between identification information of the optical transmission lines in which a sum of the first power consumption and the second power consumption is decreased and the wavelength information; and change the setting information.

5. A transmitter comprising:

a first processor configured to generate a plurality of division data obtained by dividing data, and transmit the plurality of generated division data;

a modulator configured to modulate wavelengths of transport lights, which transport the plurality of division data, respectively, based on setting information including a correspondence relationship between identification information identifying each of optical transmission lines and wavelength information indicating a wavelength, and output lights, each of which is superimposed with the respective division data, to the optical transmission lines, respectively; and a second processor configured to transmit changed setting information, which is obtained by changing the setting information, to a receiver coupled to the transmitter via the optical transmission lines by optical wavelength multiplexing communication, the second processor is configured to:

acquire first power consumption information used for a modulating process of the modulator and second power consumption information used for a de-multiplexing process of a de-multiplexer in the receiver that separates lights input from the optical transmission lines into de-multiplexed lights of a plurality of wavelengths, respectively, based on the changed setting information;

define a correspondence relationship between identification information of the optical transmission lines in which a maximum of the first power consumption and the second power consumption is decreased and the wavelength information; and change the setting information.

6. A control method of a transceiving system including a transmitter and a receiver coupled to the transmitter via optical transmission lines using optical wavelength-multiplexing communication,
    the transmitter performs a process comprising:
        generating each of a plurality of division data obtained by dividing data;
        transmitting each of the plurality of division data;
        modulating wavelengths of transport lights, which transport the plurality of division data, respectively, based on setting information including a correspondence relationship between identification information identifying each of the optical transmission lines and wavelength information indicating a wavelength, and outputting lights, each of which is superimposed with division data, to the optical transmission lines, respectively; and
        transmitting changed setting information, which is obtained by changing the setting information, to the receiver,
    the receiver performs a process comprising:
        separating lights input from the optical transmission lines into a plurality of de-multiplexed lights of a plurality of wavelengths, based on the changed setting information; and
        converting the plurality of de-multiplexed lights into division data, respectively, and
    the process performed by the transmitter further includes:
        acquiring first power consumption information used for the modulating and second power consumption information used for the separating;
        defining a correspondence relationship between identification information of the optical transmission lines in which a sum of the first power consumption and the second power consumption is decreased and the wavelength information; and
        changing the setting information.

7. A control method of a transceiving system including a transmitter and a receiver coupled to the transmitter via optical transmission lines using optical wavelength-multiplexing communication,
    the transmitter performs a process comprising:
        generating each of a plurality of division data obtained by dividing data;
        transmitting each of the plurality of division data;
        modulating wavelengths of transport lights, which transport the plurality of division data, respectively, based on setting information including a correspondence relationship between identification information identifying each of the optical transmission lines and wavelength information indicating a wavelength, and outputting lights, each of which is superimposed with division data, to the optical transmission lines, respectively; and
        transmitting changed setting information, which is obtained by changing the setting information, to the receiver,
    the receiver performs a process comprising:
        separating lights input from the optical transmission lines into a plurality of de-multiplexed lights of a plurality of wavelengths, based on the changed setting information; and
        converting the plurality of de-multiplexed lights into division data, respectively, and
    the process performed by the transmitter further comprises:
        acquiring first power consumption information used for the modulating and second power consumption information used for the separating;
        defining a correspondence relationship between identification information of the optical transmission lines in which a maximum of the first power consumption and the second power consumption is decreased and the wavelength information; and
        changing the setting information.

\* \* \* \* \*